ABSTRACT OF THE DISCLOSURE

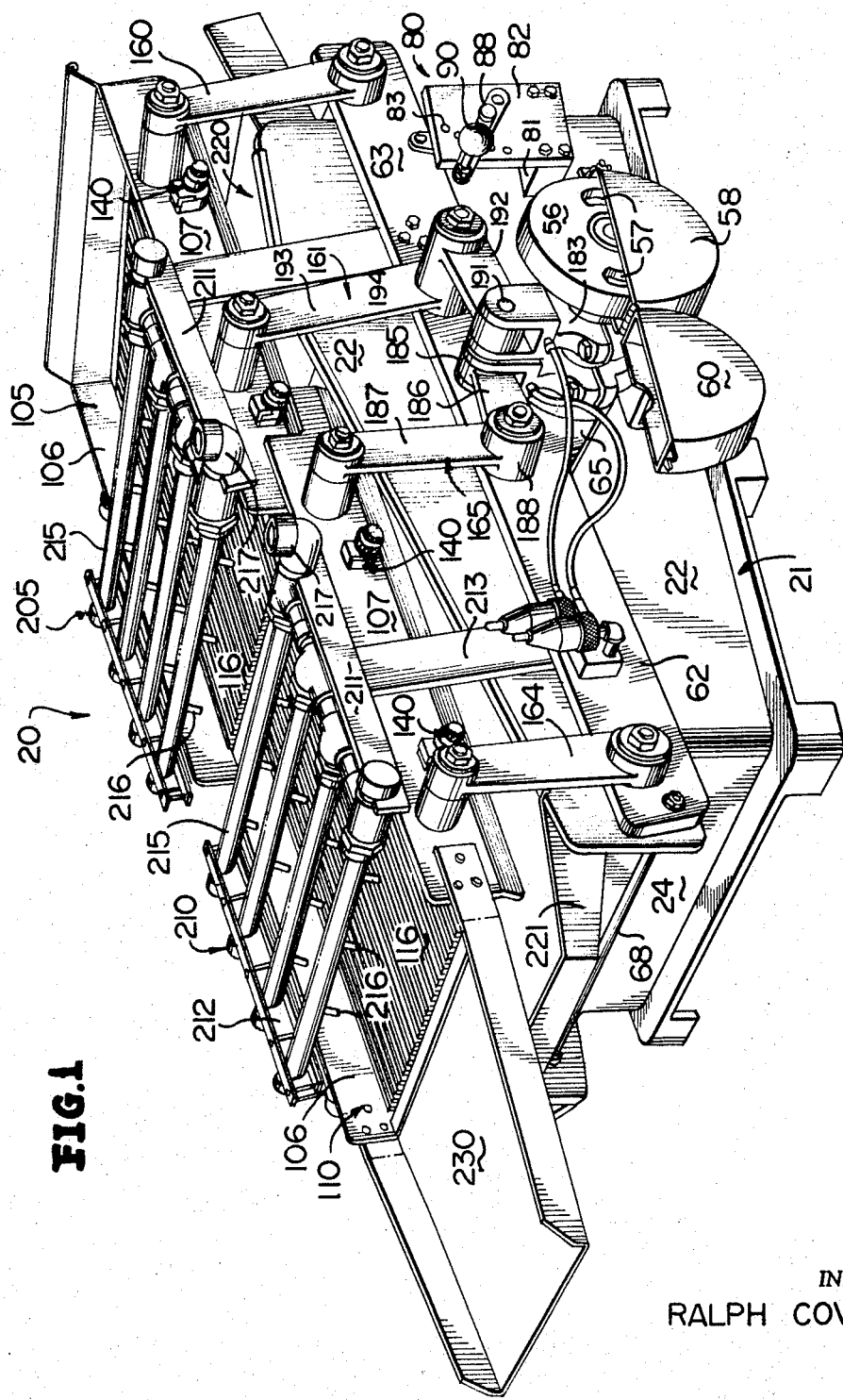

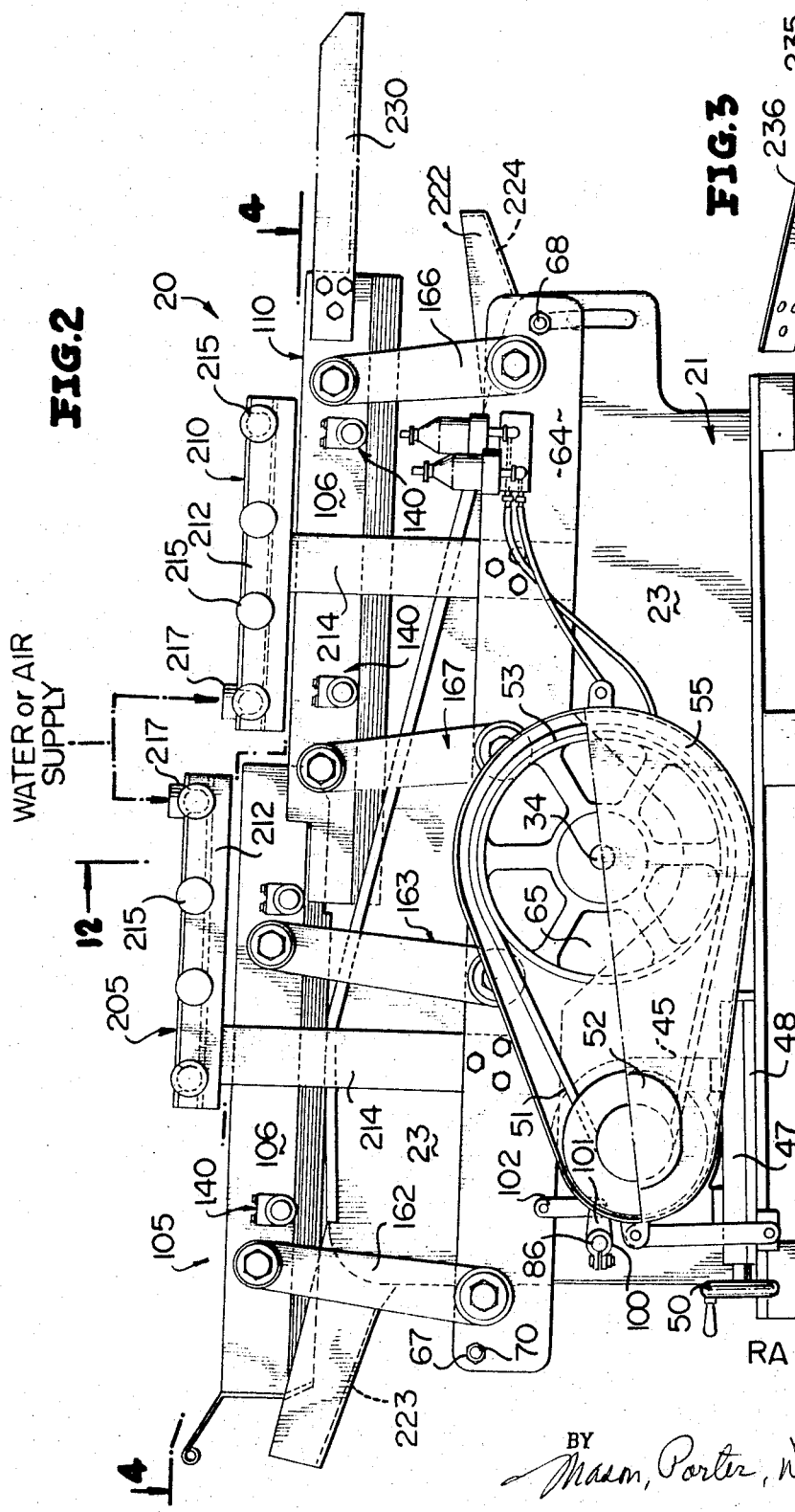

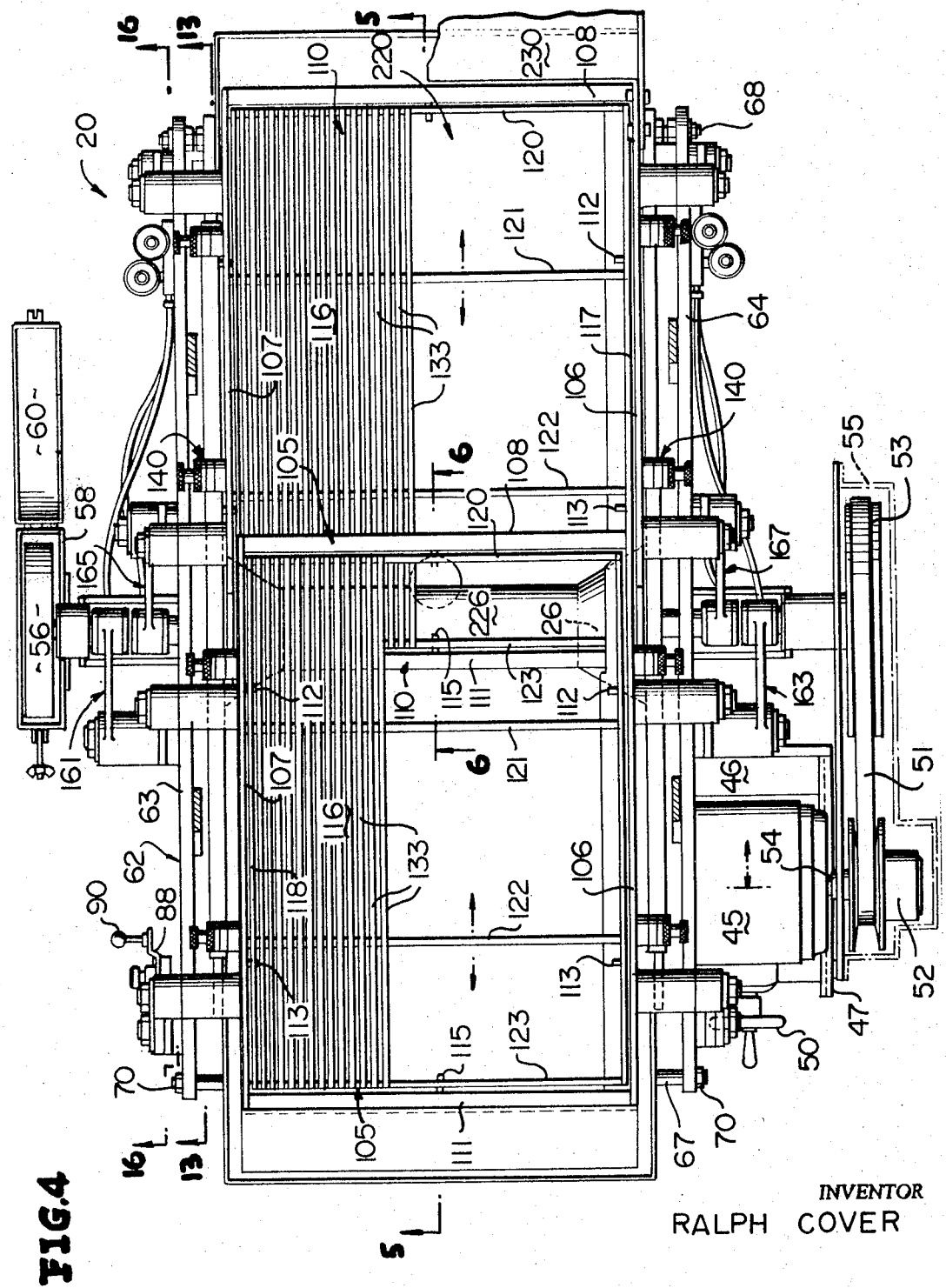

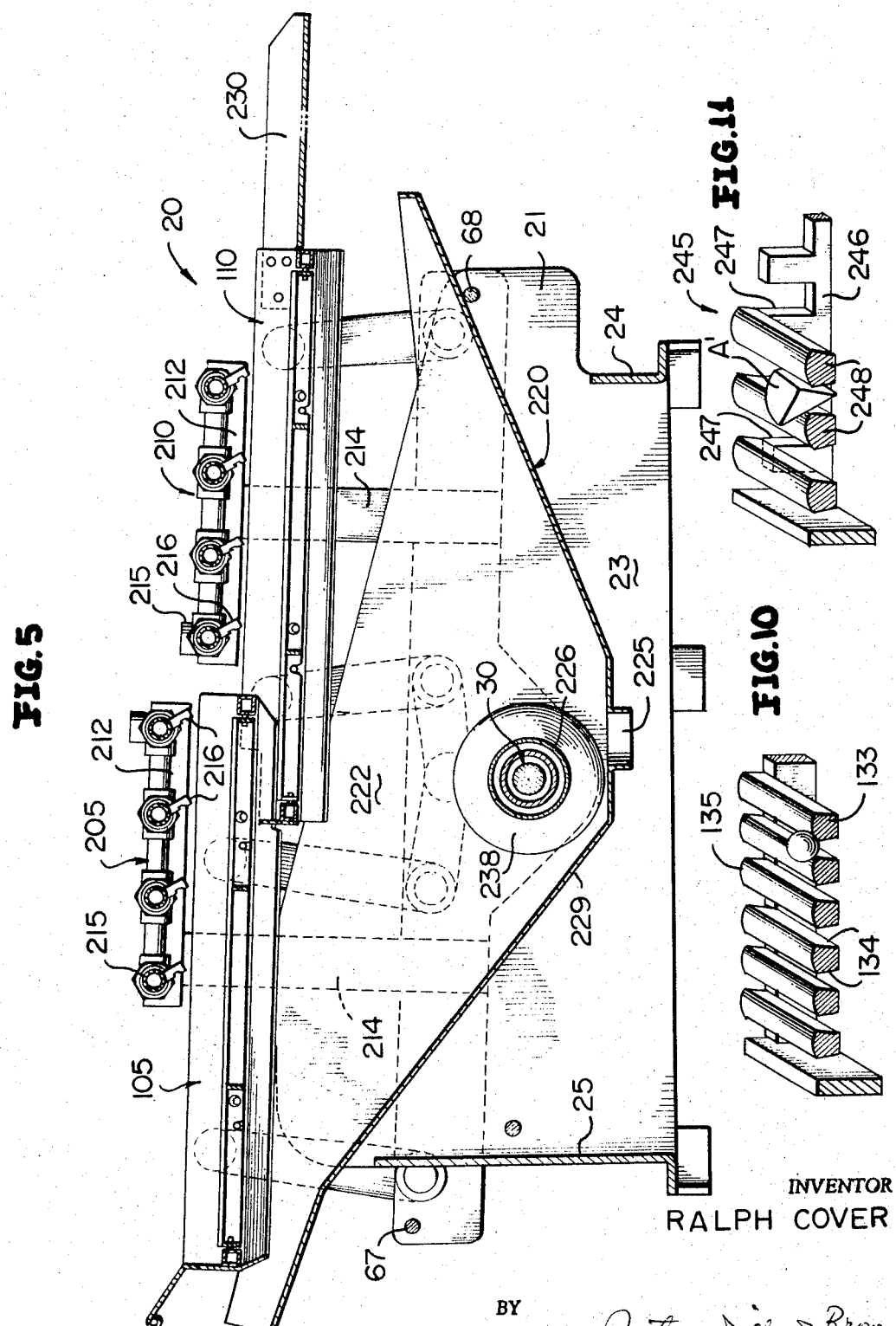

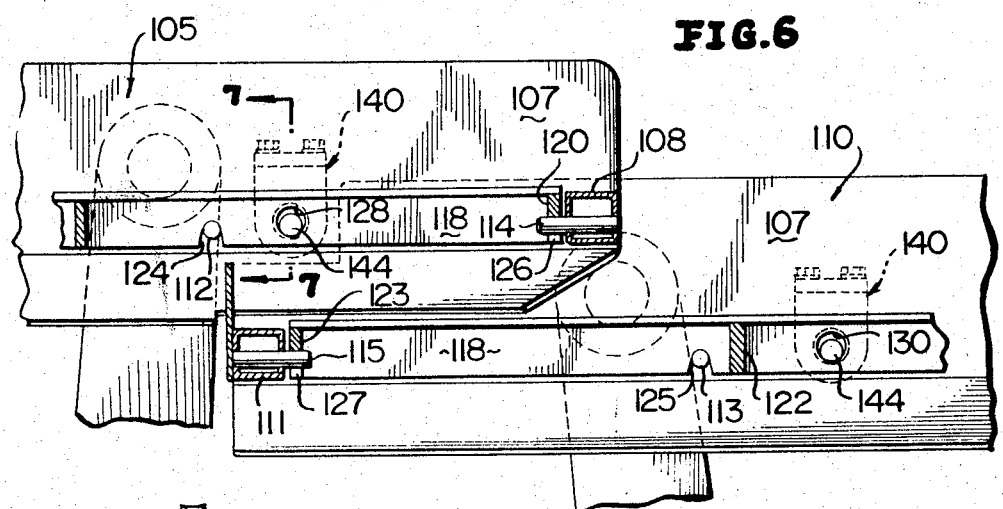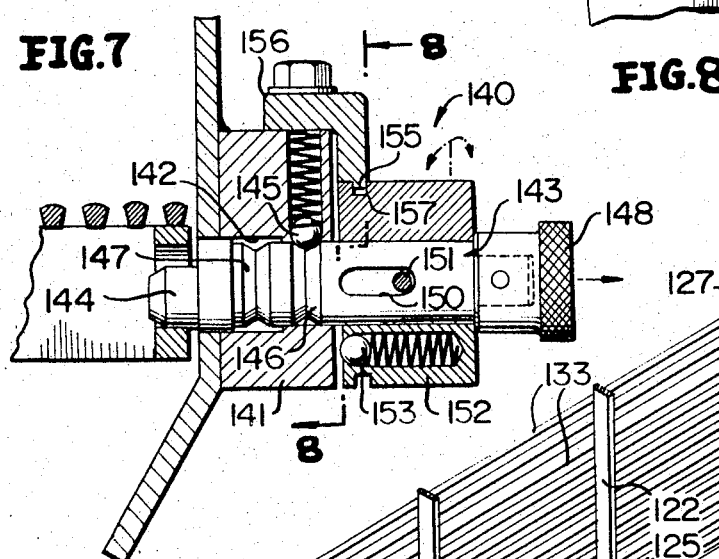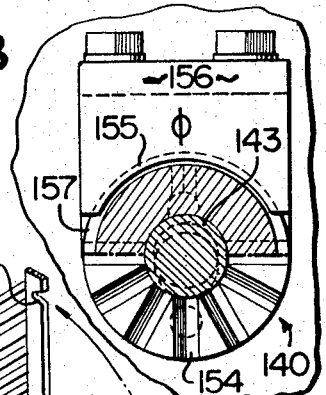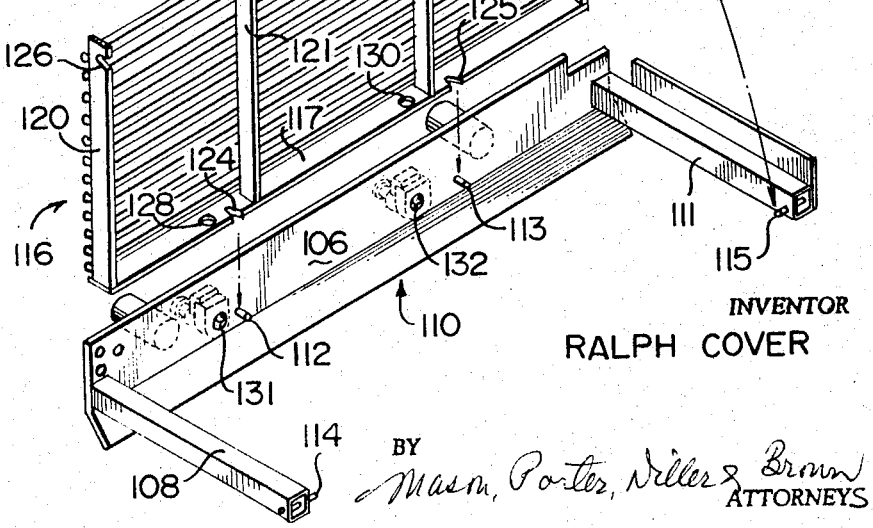

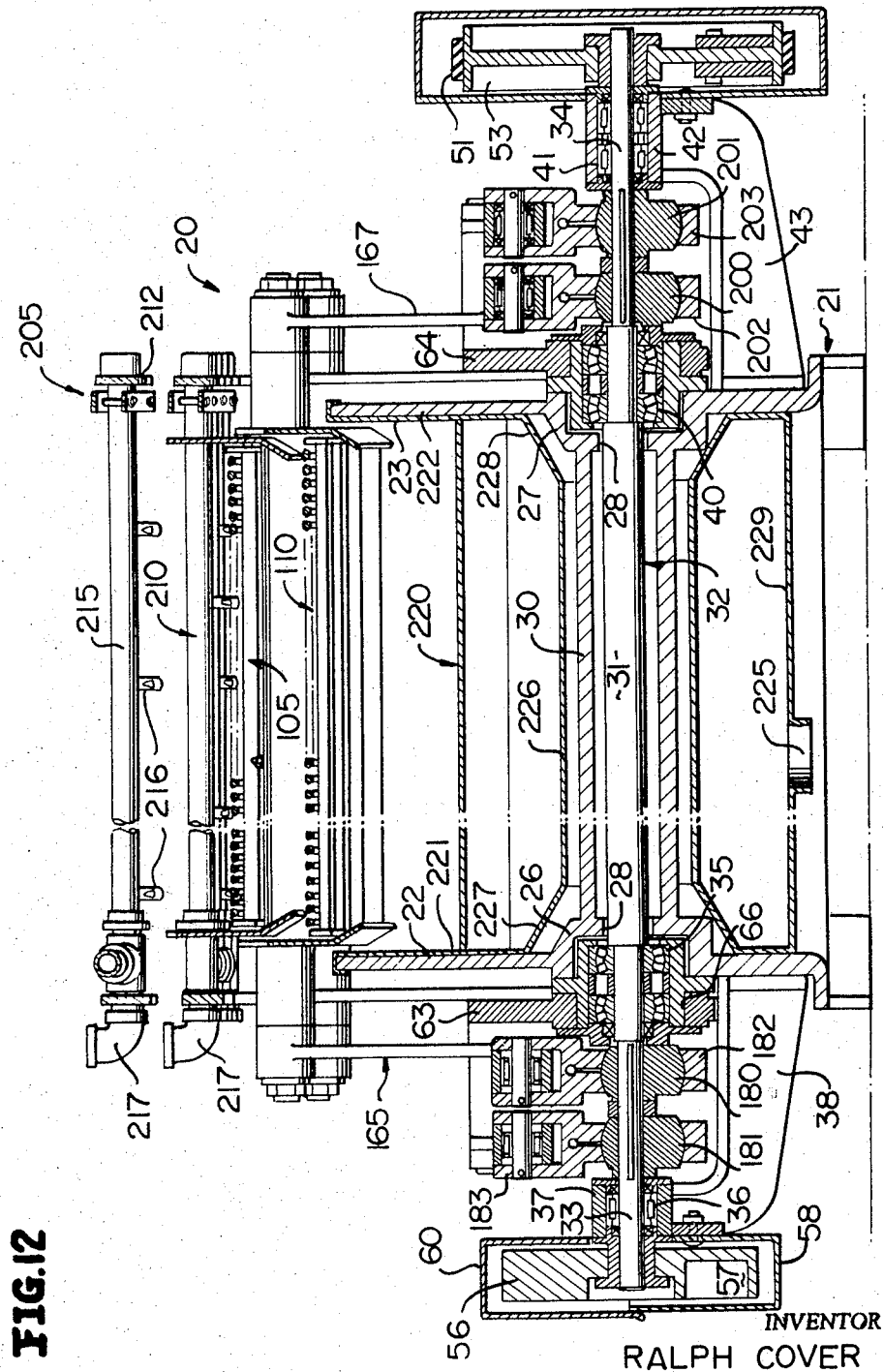

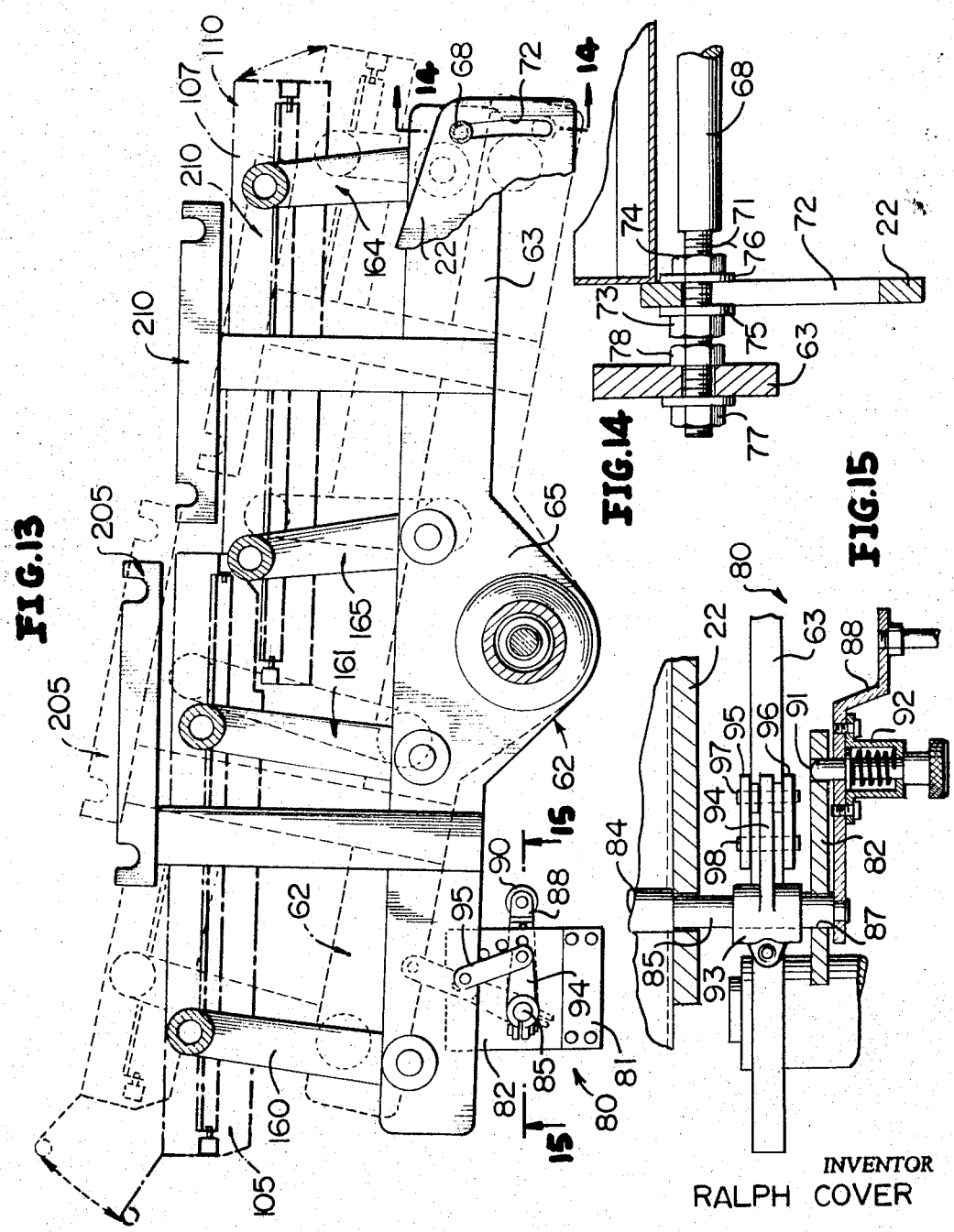

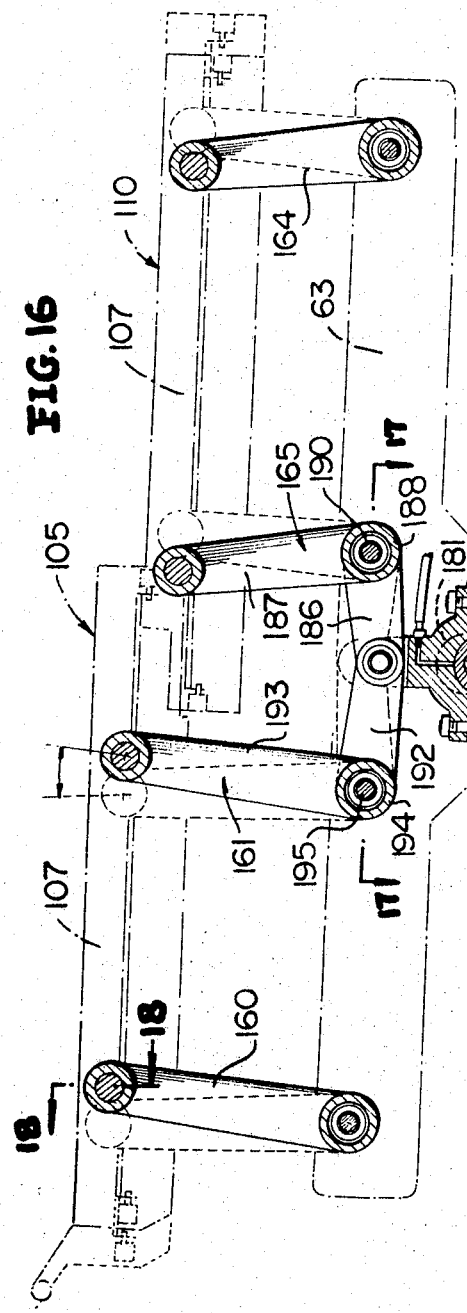
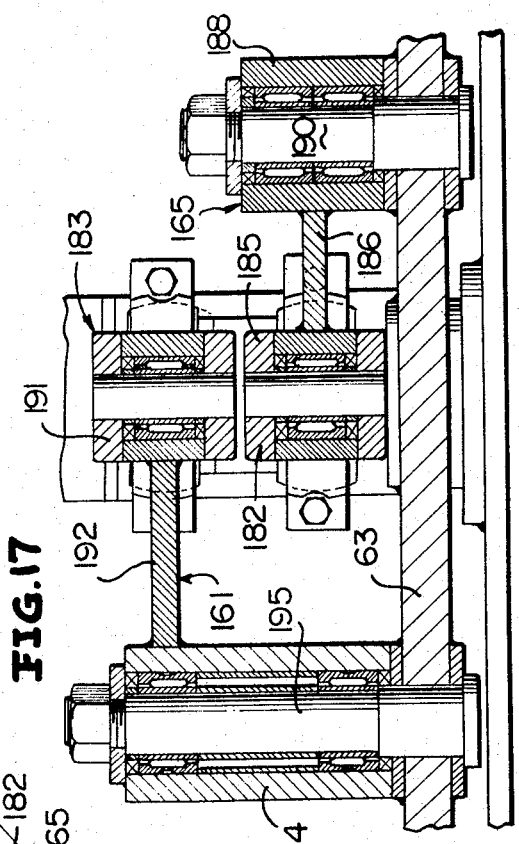
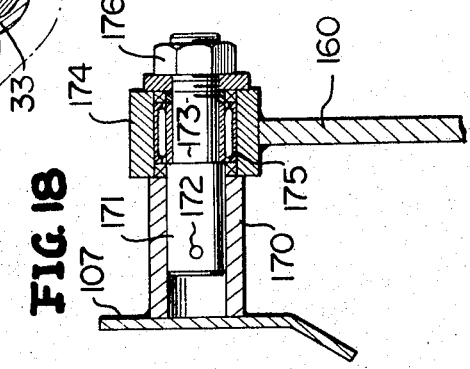
INVENTOR
RALPH COVER 3,454,162
WASHING AND SCREENING APPARATUS
Ralph Cover, c/o The United Company, Tuc Road,
Westminster, Md. 21157
Filed Apr. 10, 1967, Ser. No. 629,444
Int. Cl. B07b 1/28
U.S. Cl. 209—269                            21 Claims

A washing and screening apparatus which includes a pair of screen units removably supported in a frame which is in turn mounted for oscillatory movement upon a machine base. A transversely disposed centrally located main shaft carrying pairs of eccentrics at opposite ends thereof imparts oscillation to the screen unit frame through a pair of generally L-shaped crank arms. Means are provided for adjusting the inclination of the frame relative to the machine base, as well as for securing the screen units to frames thereof.

---

Many forms of washing and screening machines are known and one such machine which has proved quite satisfactory is fully disclosed in Letters Patent 2,588,088 issued on Mar. 4, 1952, in the name of Ralph Cover. Washing and screening machines constructed in accordance with this latter-noted patent have proved to be generally satisfactory over the years for processing a variety of products. However, such machines include several disadvantages which, in accordance with a primary object of this invention, are overcome in a highly ingenious yet simplified manner resulting in a highly efficient, uncomplicated and commercially acceptable washing and screening machine.

A major disadvantage in such conventional washing and screening machines is the excessive vibration created by the combined effects of the main drive shaft and eccentrics located at one end of the machine, the relatively long pitman arms connected between the eccentrics and the screening units, and the general horizontal disposition of the pitman arms. During the rotation of the main drive shaft the pitman arms are rapidly reciprocated or oscillated in a generally horizontal plane and the lines of force created by the pitman arms are similarly disposed in a horizontal plane. During each forward stroke of the pitman arms forces tend to shift the entire machine horizontally in a first direction while upon the return stroke oppositely directed forces tend to shift the machine in an opposite direction. This continual back and forth reversal of forces in a horizontal plane causes undesirable though slight bodily movement of the machine and, in the case where a base of the machine is anchored to the floor, the anchorage can be eventually worked loose and rendered basically inoperative.

Due to the position of the main drive shaft and the eccentrics at one end of the machine the pitman arms are quite long and tend to deflect more than would, for example, shorter pitman arms resulting in the more rapid wear of bearings or similar coupling means associated with the pitman arms. The down-time and the life of the machine may be correspondingly increased and decreased, respectively.

Another disadvantage of such conventional washing and screening machines is the tendency of articles jamming during their movement on the screening unit irrespective of the vibratory or oscillatory movement thereof. This is particularly true of wedge-shaped products, such as apple slices, which project between adjacent rods of the screening units and contact lower bridging members to which the rods are secured. When such product jamming occurs it is, of course, necessary to stop the machine, relieve the jammed condition and restart the machine knowing only too well that jamming will again more than likely occur. This constant machine stoppage represents a direct increase in the cost of processing both to the processor and the eventual consumer of the processed product.

The above and other disadvantages of conventional machines are overcome in accordance with this invention by the provision of a washing and screening machine which includes a main drive shaft and eccentrics disposed substantially medially of opposite ends of the machine, and relatively short crank arms or pitman arms which are oscillated in a generally vertical direction, thus resulting in reduced machine vibrations and appreciably less wear to moving components of the machine.

Another object of this invention is to provide a novel machine of the type immediately heretofore described in which the bridging members of each screening unit are provided with upwardly opening notches between adjacent screen rods to permit articles, such as wedge-shaped cut apples, mushrooms, etc., to pass freely and unobstructively through the machine during a processing operation.

Still another object of this invention is to provide a novel washing and screening machine of the type described wherein each screening unit is defined by a frame and a screen, means for removably supporting the screen upon the frame, means for locking the screen to the frame, means for releasing the locking means without affecting the supporting means, and means connecting the frame to the eccentrics separate and apart from the supporting, locking and releasing means whereby the screens can be removed from the frame without disrupting the connection between the frame and the eccentrics.

A further object of this invention is to provide a novel washing and screening machine of the character heretofore described wherein the screen is defined by a plurality of rods disposed in generally spaced parallel relationship, and heliarc weld means secure each rod to a plurality of transverse bridging members.

Still another object of this invention is to provide a novel washing and screening machine of the type heretofore described wherein the coupling means includes eccentric means for selectively loosening or tightening the screen and frame to vary the vibratory forces of the screening units during a processing operation.

With the above and other objects in view that will hereinafter appear, the nature of the invention will be more clearly understood by reference to the following detailed description, the appended claims, and the several views illustrated in the accompanying drawings.

In the drawings:

FIGURE 1 is a perspective view of the washing and screening machine of this invention, and illustrates a main drive shaft disposed generally medially of and transverse to a base of the machine, and a short vertical crank arm associated with each eccentric.

FIGURE 2 is a side elevational view of the washing and screening machine, and illustrates the side of the machine opposite that shown in FIGURE 1.

FIGURE 3 is a top perspective view of a modified discharge chute of the machine, and illustrates a plurality of parallel rods along which articles move from left-to-right.

FIGURE 4 is a sectional view taken generally along line 4—4 of FIGURE 2, and more clearly illustrates the location of the main drive shaft and eccentrics, a pair of screen units, and a catch basin beneath the screen units.

FIGURE 5 is a sectional view taken generally along line 5—5 of FIGURE 4, and illustrates a tubular portion of the catch basin housing a portion of the main drive shaft.

FIGURE 6 is an enlarged fragmentary sectional view taken generally along line 6—6 of FIGURE 4, and illustrates means for lockingly supporting each screen to its associated screen unit.

FIGURE 7 is an enlarged fragmentary sectional view taken generally along line 7—7 of FIGURE 6, and illustrates a reciprocal and rotatable pin having a terminal portion received in an opening of the screen frame.

FIGURE 8 is a fragmentary sectional view taken generally along line 8—8 of FIGURE 7 and illustrates grooves cooperative with a spring biased ball for locking the pin in any one of a plurality of different positions of relative rotation.

FIGURE 9 is a perspective fragmentary view of one of the screening units, and illustrates notches in a frame of the screen which receive pins carried by a frame of the screening unit for supporting the former upon the latter.

FIGURE 10 is a fragmentary sectional view of one of the screening units, and illustrates a plurality of parallel rods resting upon and secured to transverse bridging members.

FIGURE 11 is a fragmentary cross-sectional view of another screen, and illustrates notches in a bridging member opening upwardly between adjacent rods to define means for preventing article jamming.

FIGURE 12 is a sectional view taken generally along line 12—12 of FIGURE 2, and illustrates the journalling of the main drive shaft to the machine base, a drive pulley connected to one end of the drive shaft, and a counterbalance connected to an opposite end of the drive shaft.

FIGURE 13 is a sectional view taken generally along line 13—13 of FIGURE 4, and illustrates a frame member of the machine journalled in coaxial relationship to the main drive shaft, and means for varying the inclination of the frame member and the screen units carried thereby.

FIGURE 14 is an enlarged fragmentary sectional view taken generally along line 14—14 of FIGURE 13, and illustrates means for limiting the inclination of the frame member in either of two directions of movement thereof.

FIGURE 15 is an enlarged fragmentary sectional view taken generally along line 15—15 of FIGURE 13, and illustrates means for adjustably locking the frame member in various positions of inclination.

FIGURE 16 is a sectional view taken generally along line 16—16 of FIGURE 4, and diagrammatically illustrates opposite cycle movement of the screen units.

FIGURE 17 is an enlarged sectional view taken generally along line 17—17 of FIGURE 16, and illustrates the pivotal connection of a pair of connecting arms to associated screen units, the frame member and crank arms.

FIGURE 18 is an enlarged sectional view taken generally along line 18—18 of FIGURE 16, and more clearly illustrates the pivotal connection between a connecting link and one of the screen units.

A novel washing and screening machine constructed in accordance with this invention is generally designated by the reference numeral 20, and includes a base 21 (FIGURES 1, 2, 5 and 12) defined by side walls 22, 23 and end walls 24, 25. The side walls 22, 23 are provided with respective recessed portions 26, 27 (FIGURE 12) located generally midway between the end walls 24, 25. Each recessed portion 26, 27 is provided with a circular aperture or opening 28 (FIGURE 12), and the recessed portions 26, 27 are joined by an integral tubular sleeve 30.

A central portion 31 of a main drive shaft 32 is housed generally within the sleeve 30 while opposite end portions 33, 34 of the main drive shaft 32 project outboard beyond the respective side walls 22, 23. The end portion 33 of the shaft 32 is journalled for rotation by anti-friction bearing assemblies 35, 36 in the respective recessed portion 26 of the side wall 22 and a collar 37 of an angular arm 38 welded or otherwise secured to a lower portion of the side wall 22 (FIGURE 12). The opposite end portion 34 of the shaft 32 is similarly respectively journalled by anti-friction bearing assemblies 40, 41 in the recessed portion 27 and a collar 42 of an angular arm 43 welded or otherwise conventionally secured to a lower portion of the side wall 23.

The main drive shaft 32 is driven from a variable speed electric motor 45 (FIGURES 2 and 4) which is fixed to a plate 46. The plate 46 is slidably mounted in grooves (unnumbered) of a pair of upstanding plates 47 (only one of which is illustrated). The plates 47 are in turn fixed to a lower plate 48 which is welded or otherwise secured to the side wall 23 of the base 21. A hand wheel 50 and threaded coupling means (not shown) between the plates 46 and 48 permit the motor 45 to be shifted left-to-right or right-to-left as viewed in FIGURES 2 and 4 to vary the tension of a pulley belt 51 entrained about pulleys 52, 53 which are in turn respectively fixed to a shaft 54 of the motor 45 and the end portion 34 of the main shaft 32. A cover or guard 55 houses the pulleys 52, 53 and the pulley belt 51, and the guard 55 is suitably secured by conventional means (unnumbered) to the side wall 23 of the base 21.

A counterbalancing weight 56 (FIGURES 1, 4 and 12) is fixed to the end potrion 33 of the main shaft 32. A pair of hand-gripping recesses 57 are formed in the counterbalancing weight 56 for manually rotating the main drive shaft 32. The counterbalancing weight 56 is partially received in a housing or casing 58 secured to the angular arm 38 (FIGURE 12) by conventional fasteners (unnumbered). A cover 60 is hingedly secured to the casing 58 for pivoting between the positions thereof illustrated in FIGURES 1 and 12 of the drawings.

A frame member, generally designated by the reference 62 is mounted on the base 21 for pivoting or rocking movement relative thereto. The frame member 62 includes side rails 63, 64 adjacent and outboard of the respective side walls 22, 23 of the base 21 (FIGURE 12) The side rails 63, 64 include medial depending generally V-shaped portions 65 which are each apertured at 66 to receive the housings (unnumbered) of the anti-friction bearing assemblies 35, 40, respectively. In this manner the frame member 62 is journalled for pivoting movement about an axis coaxial with that of the main drive shaft 32.

The side rails 63, 64 of the frame member 62 are connected to each other by one or more transverse rods 67 (FIGURE 4), 68 (FIGURES 1 and 2) etc. The rod 67 includes threaded reduced end portions (unnumbered) which pass through apertures (similarly unnumbered) of the side rails 63, 64 and are secured thereto by nuts 70 in the manner best illustrated in FIGURE 4 of the drawings.

The rod 68 includes axially opposite threaded end portions 71 (FIGURE 14) which pass through an associated arcuate slot 72 in each of the side walls 22, 23, of the base 21. A pair of nuts 73, 74 and washers 75, 76 (FIGURE 14) prevent the rod 68 from shifting axially in the slots 72 and serve as means for guiding the end portions 71 in the slots 72 between the upper and lower limits of these slots. The threaded end portions 71 of the rod 68 are also fixedly secured to the side rails 63, 64 of the frame member 62 by a pair of nuts 77, 78. The rod 68 is thereby securely coupled to the side rails 63, 64 of the frame member 62 and is free to move therewith in the slots 72 of the base side walls 22, 23 upon the pivoting of the frame member 62 in a manner and for a purpose to be described more fully hereafter.

A mechanism for maintaining the frame member 62 in a selected position of angular adjustment relative to the horizontal is best illustrated in FIGURES 1, 13 and 15 of the drawings, and is generally designated by the reference numeral 80. The adjusting mechanism 80 includes a block 81 fixed to the side wall 22 by conventional means (not shown) to which is in turn secured an upstanding plate 82. The plate 82 is provided with a plurality of apertures 83 arranged along an arcuate path equally distant from the axis of a shaft 84 having end portions 85, 86 (FIGURES 15 and 2, respectively) projecting through apertures (unnumbered) in the respective side walls 22, 23 of the base 21. The end portion 85 of the shaft 84 projects through an opening 87 of the plate 82 and has secured thereto an arm 88 carrying a gripping knob or handle 90 (FIGURE 1). A spring biased locking pin 91 is reciprocally carried by a housing 92 secured to the arm 88 in the manner clearly illustrated in FIGURE 15 of the drawings.

The end portion 85 of the shaft 84 is secured to the side rail 63 of the frame member 62 by a collar 93 having a projecting link 94. The terminal end portion (unnumbered) of the link 94 is secured to each of a pair of links 95, 96 by a conventional pivot 97. A washer (unnumbered) is positioned between the link 94 and each of the links 95, 96 to maintain the links 95, 96 spaced from each other a distance substantially equal to the thickness of the side rail 63. The side rail 63 is sandwiched between the opposite end portions (unnumbered) of the links 95, 96, and the latter links are connected to the side rail 63 by a pivot 98.

The opposite end portion 86 of the shaft 84 includes a collar 100 (FIGURE 2) and links 101, 102 and another link (not shown) corresponding to the collar 93, link 94, and links 95, 96 associated with the side rail 63. The links 101, 102 are secured to each other by a conventional pivot (unnumbered) while the link 102 is similarly conventionally pivoted to the side rail 64.

When it is desired to vary the inclination of the frame member 62 relative to the horizontal, the pin 91 is retracted from its engagement with one of the openings 83 in the plate 82 and the arm 88 is pivoted in a desired direction by grasping the knob 90. As the arm 88 is pivoted in either direction the shaft 84 is similarly pivoted to impart swinging movement to the links of the mechanism 80 and associated pivoting movement of the frame 62 about its axis. For example, if it is desired to tilt the frame 62 from the solid to the phantom outline position thereof shown in FIGURE 13 the arm 88 is rotated counter-clockwise in this figure causing the links 94, 95 and 96 to move from the solid to the phantom-outline position in this same figure. At this point the pin 91 is released and registers with the uppermost apertures 83 in the plate 80 to maintain the frame member 62 in its desired position. This adjustment of the frame member 62, can, of course, be made both while the apparatus 20 is operative or inoperative.

The frame member 62 is selectively adjusted to vary the inclination of an upper screen unit 105 (FIGURE 1) and a lower screen unit 110 carried by the frame member 62 to adjust the speed at which articles travel from right-to-left in FIGURE 1 during the oscillation or reciprocation of the screen units 105, 110 as will be more apparent immediately hereafter.

The screen units 105, 110 each include a frame defined by sides 106, 107 and tubular cross pieces 108, 111, as is best illustrated in FIGURE 9 of the drawings with respect to the lower screen unit 110. The side rails 106, 107 include axially aligned and opposed pins 112, 113 (FIGURES 4 and 9), while the cross pieces 108, 111 include similarly axially aligned opposed pins 114, 115. The function of the pins 112 through 115 is to support a screen 116 of each of the screen units 105, 110.

The screens 116 are substantially identical to each other, and each screen includes a frame defined by sides 117, 118 and a plurality of transverse bridging members 120 through 123. Notches 124, 125 are formed in each of the sides 117, 118 in alignment to register with the pins 112, 113 of the sides 106, 107. Similarly, notches 126, 127 are formed in the transverse bridging members 120, 123 to register with the respective pins 114, 115 of the connecting pieces 108, 111, respectively. Openings 128, 130 in the sides 117, 118 of the screens 116 are adapted to register with similar circular openings 131, 132 of the sides 106, 107 for a purpose to be described more fully hereafter. A plurality of generally parallel rods 133 preferably constructed from stainless steel are seated upon the upper surfaces (unnumbered) of the transverse bridging members 120 through 123. The rods 133 are secured to the bridging members by means of a heliarc weld which fuses the entire abutting surfaces of the rods and the transverse bridging members to each other in the absence of weld fillets which might otherwise provide obstructions to article travel between adjacent ones of the rods 133. The rods 133 each include upwardly and outwardly sloping side surfaces 134 and an upper convex surface 135 which facilitates the movement of articles along the screens 116 during the oscillation of the screen units 105, 110 in a manner to be described hereafter.

Means generally referred to by the reference numeral 140 (FIGURES 6 through 8) are provided for locking each of the screens 116 to its associated screen unit 105, 110, and varying the tightness or looseness of the screens 116 depending upon the particular articles which are to be processed. There are two mechanisms 140 associated with each side 106, 107 of each of the screen units 105, 110, and each mechanism 40 includes a housing 141 secured to an associated side 106, 107 adjacent one of the respective apertures 131, 132. The housing 140 includes a bore 142 which partially houses a pin 143. The pin 143 includes a radially offset terminal end portion 144 defining an eccentric which is received in an associated one of the openings 128, 130 of the screens 116. A spring biased ball detent 145 is seated in a peripheral groove 145 of the pin 143 when the pin 143 is in its projected or left most position as viewed in FIGURE 7 of the drawings at which time the terminal end portion 144 of each mechanism 140 locks the screens 116 in position as will be described more fully hereinafter. The ball detent 145 is adapted to be received in another peripheral groove 147 of the pin 143 when the latter is retracted to the right as viewed by FIGURE 7 by grasping and pulling a knurled knob 148 at which time the eccentric portion 144 is drawn completely out of engagement with the screen openings or apertures 128, 130. In this position of the pin 143 the screen 116 of each screen unit 105, 110 is supported solely by the pins 112 through 115 and the associated notches 124 through 127.

The pin 143 is provided at the medial portion (unnumbered) thereof with a slot 150 which receives a pin 151, the latter being in turn fixed to a rotatable member 152. The connection between the slot 150 and the pin 151 permits the pin 143 to be reciprocated between its projected and retracted positions and also permits the pin 143 to be rotated by turning the rotatable member 152 clockwise or counterclockwise. The rotatable member 152 similarly carries a spring biased ball detent 153 which may be selectively engaged in any one of a plurality of radial grooves 154 (FIGURE 8) formed in a face (unnumbered) of the housing 141. The rotatable member 152 is maintained in assembled relationship to the housing 141 by means of an arcuate flange 155 of a member 156 fixed to the housing 141 with the flange 55 being received in an outwardly opening circumferential groove 157 of the member 152.

As was heretofore noted, the purpose of the mechanism 140 is to both lock the screens 116 to their associated screen units and vary the tightness (or looseness) of the screens. Referring to FIGURE 6 of the drawings, the eccentric 144 of the mechanism 140 is illustrated in its lowermost position at which time the notch 125 is urged into forceful bearing engagement with the pin 113. The remaining three locking mechanisms 140 associated with the screening unit 110 of FIGURE 6 are in a similar position and the remaining notches 124, 126 and 127 are likewise in forceful bearing engagement with their associated pins. The screen 116 is thereby tightly secured to the associated screen unit 110. If it is desired to loosen the screen 116 of either screen unit the rotatable member 152 in turn clockwise or counterclockwise to raise the eccentric 144 as viewed in FIGURE 6 and correspondingly reduce the forces urging the notch 125 into engagement with the pin 113. When the remaining mechanisms 140 are similarly adjusted the screen 116 is loosely secured to the screen unit 110 and reciprocal movement imparted to the latter in a manner to be described immediately hereafter is accentuated by the movement of the screen 116 relative to the screen unit to permit articles to more rapidly and vigorously pass through the machine 20.

The upper screen unit 105 is supported above the frame member 62 by a link 160 and a connecting arm 161 articulately connected between the side rail 63 and the frame 107 (FIGURE 1) and a similar link 162 and a connecting arm 163 articulately connected between the side 106 of the unit 110 and the side rail 64 (FIGURE 2). The lower screen unit 110 is also connected to the frame member 62 by a link 164 and a connecting arm 165 articulately coupled between the side 107 of the unit 110 and the side rail 63, while a similar link 166 and a similar crank arm 167 are articulately connected between the side 106 of the unit 110 and the side rail 64 of the frame member 62.

The links and arms are each identically coupled to the sides 106, 107 of the screen units 105, 110 in the manner illustrated in FIGURE 18 of the drawings which illustrates the connection between the link 160 and the side 107 of the screen unit 110. A cylindrical sleeve 170 is welded or otherwise secured to the side 107 and receives a pin 171 which is fixed in the sleeve 170 by a cross pin 172. A reduced end portion 173 of the pin 171 is received in a collar portion 174 of the link 160, and an antifriction bearing assembly 175 is housed in the collar 174 in the manner clearly illustrated in FIGURE 18. A nut 176 secured to a threaded portion (unnumbered) of the pin 171 maintains the link 172 assembled upon the pin 171.

The links 160, 164, 162 and 166 are similarly journalled to the frame member 62 and a description thereof is believed unnecessary for a complete understanding of this invention.

Reference is now made to FIGURES 1, 12, 16 and 17 of the drawings which illustrate the coupling arrangement of the connecting arms 161, 165 between the screen units 105, 110, the side rail 63 of the frame member 62 and the main drive shaft 32. As is best illustrated in FIGURE 12 of the drawings, two eccentrics 180, 181 are fixed to the end portion 33 of the drive shaft 32. A first end portion (unnumbered) of a pair of crank arms 182, 183 are coupled to the respective eccentrics 180, 181. The crank arms 182, 183 are relatively short and are positioned in generally side-by-side relationship in an upstanding vertical plane. A bifurcated upper terminal end portion 185 of the crank arm 182 is journalled to a first end portion 186 of the connecting arm 165. The end portion 186 and a second end portion 187 of the connecting arm 165 are disposed in generally normal relationship to each other and are welded or otherwise secured to a collar 188 which is pivotally journalled to a pin 190 fixed to the side rail 63 of the frame member 62. A bifurcated end portion 191 of the crank arm 183 is similarly journalled to a first end portion 192 of the connecting arm 161. The end portion 192 and another end portion 193 of the connecting arm 161 are disposed generally normal to each other and are each fixed to a collar or sleeve 194 which is in turn journalled for rotation about a pin 195 fixed to the side rail 63 of the frame member 62. The uppermost end portions (unnumbered) of the connecting arms 161, 165 are in turn journalled to the sides 107 of the respective screen units 105, 110 in the manner shown in FIGURE 18 of the drawings and the various connections between the arms 161, 165, 182, 183, etc. are provided with suitable anti-friction bearing assemblies (FIGURE 17). The eccentrics 180, 181, are also circumferentially offset 180° relative to each other whereupon rotation imparted to the main drive shaft 32 shifts the screen units 105, 110 from, for example, the solid to the phantom outline positions thereof shown in FIGURE 16 and back again in a continuous manner. The screen units 105, 110 thereby move first away from each other and then toward one another to effect a counterbalancing action due to the offset relationship of the eccentrics 180, 181.

The opposite end portion 34 of the shaft 32 is similarly provided with eccentrics 200, 201 and associated crank arms 202, 203. The connection of the crank arms 202, 203 to the respective screen units 110, 105 is identical to that heretofore described relative to the connection of the eccentrics 180, 181 with the screen units 110, 105, and a further description thereof is believed unnecessary for a complete understanding of this invention.

A pair of spraying units 205, 210 (FIGURE 1) are disposed above the respective screen units 105, 110 for directing a fluid media, such as water or air, downwardly toward and against articles being processed by the machine 20. The spraying units 205, 210 each include opposite frame members 211, 212 joined by respective upright brackets 213, 214 to the respective side rails 63, 64 of the frame member 62. Thus, any adjustment in the inclination of the frame member 62 similarly identically adjusts the inclination of the spraying units 205, 210. Each of the spraying units 205, 210 includes a plurality of innerconnected pipes 215 having nozzles 216 directed downwardly toward the screens 116. The spraying units 205, 210 are coupled to a conventional source of fluid media (not shown), such as tap water by conventional coupling members 217. As articles, such as peas, dried beans, string beans, cut corn, lima beans, raspberries, etc. are advanced from the screen unit 105 toward and beyond the screen unit 110 water or a similar fluid media directed from the nozzles 216 thoroughly cleanses the articles as the latter are continually agitated by the continuous oscillation or reciprocation of the screen units.

A catch basin or catch pan 220 is positioned between the side walls 22, 23 of the base 21 and includes sides 221, 222 engaged over upper edges (unnumbered) of the respective base side walls 22, 23 (FIGURE 12). The catch pan 220 is closed at opposite ends by end wall 223, 224 (FIGURE 2) and at the bottom by a bottom wall 229 having an outlet opening 225 (FIGURE 12) adapted to be connected to a conventional drain. A cylindrical sleeve 226 (FIGURE 12) of the catch pan 220 surrounds the tubular sleeve 30 of the base 21, and it is joined by flared portions 227, 228 to the respective side walls 221, 222. Due to this arrangement of the sleeve 226 the latter, the tubular sleeve 30 and the main drive shaft 32 are all disposed in coaxial relationship substantially medially of the longitudinal axis of the machine 20.

A discharge chute (FIGURE 2) is preferably connected to the dscharge end of the screen 110 by bolts (unnumbered) in the manner readily aparent from FIGURE 1 of the drawings. In the embodiment of the invention illustrated in FIGURES 1 and 2 the discharge chute 230 is of a solid one-piece metallic construction, but the same may be constructed in much the manner as the individual screens 116, as in the case of a discharge chute 235 of FIGURE 3. The discharge chute 235 includes side rails 236, 237 and a pair of transverse bridging members 238, 240. A plurality of rods 241 disposed in generally parallel relationship are secured to the upper surfaces of the bridging members 238, 240 in the same manner as the rods 133 are secured to the bridging members 129 through 123. The transverse cross-sectional configuration of the rods 241 is also preferably identical to that of the rods 133 (FIGURE 10). It has been found that rods of this configuration are exceptionally efficient in the screening of products and there is little or no danger of clogging of the screens or the discharge chute of FIGURE 3.

The screens 116 are particularly constructed for processing regular shaped articles, such as peas, raspberries or similar articles A (FIGURE 10). Such articles freely move along the screen 116 supported by, for the most part, adjacent ones of the rods 133. However, in accordance with another embodiment of this invention screens are provided which are particularly adapted for processing irregularly shaped articles, such as mushrooms, wedge-shaped slices of apples or similar fruit, etc. Referring in particular to FIGURE 11 of the drawings, a portion of a screen 245 is illustrated which corresponds substantially identically to the screens 116 heretofore described. However, the only difference in the screen 245 as compared to the screens 116 is in the particular construction of the bridging members 246 (only one of which is illustrated). The bridging members 246 are each provided with a plurality of upwardly opening notches, slots or grooves 247 disposed between each adjacent pair of rods 248. The notches 247 prevent irregularly shaped or wedge-shaped articles, such as the article A′, from jamming as the articles pass beyond the bridging members 246 through the slots 247. In the absence of notches corresponding to the notches 247 or similar means the portions of the articles A′ projecting downwardly between adjacent rods 248 might otherwise contact the non-relieved bridging members and article jamming would eventually occur. However, such jamming is virtually precluded by the novel provision of the notches 247 and machine downtime is thereby correspondingly reduced.

I claim:

1. A machine of the character described comprising a base having opposite end portions, means connecting a frame member to said base for relative movement therebetween, a plurality of screen units disposed above said frame member, means for oscillating said screen units, said oscillating means including a main drive shaft disposed transversely of said base, means rotatably journalling said main drive shaft to said base approximately centrally of the base end portions whereby machine balance is maintained irrespective of the oscillating motion of the screen units, said connecting and journalling means being in coaxial relationship, said base including a pair of side frames, said main drive shaft having opposite end portions projecting outboard of said side frames, said oscillating means including eccentric means coupled to each of said shaft end portions, each of said eccentric means including a pair of angularly offset eccentrics carried by an associated shaft end portion, a crank arm having opposite end portions associated with each eccentric, said crank arms each being pivotally connected medially of opposite ends thereof to an associated side frame, a first end of each crank arm being connected to one of said eccentrics, a second end of one of said crank arms adjacent each of said side frames being pivotally connected to one of said screen units, and a second end of another of said crank arms adjacent each of said side frames being pivotally connected to the other of said screen units whereby rotation of said main drive shaft imparts opposite oscillating motion to said screen units.

2. The machine as defined in claim 1 wherein said base includes a transversely disposed sleeve located approximately centrally of said base end portions, and said main drive shaft is in internal telescopic relationship to said sleeve.

3. The machine as defined in claim 1 wherein said crank arms are arranged in pairs adjacent each side frame, and each pair of crank arms is defined by an L-shaped crank arm generally disposed in opposed relationship to an inverted L-shaped crank arm.

4. The machine as defined in claim 1 wherein each screen unit includes a screen defined by a plurality of rods disposed in generally parallel relationship, and each of said rods has a transversely convex upper surface and sides which slope downwardly and inwardly thereby to provide a clearing space gradually increasing in width downwardly between each two adjacent rods.

5. The machine as defined in claim 1 including means beneath the screen unit for collecting material which has passed therethrough, said collecting means includes a tubular sleeve in external surrounding relationship to said main drive shaft.

6. The machine as defined in claim 1 wherein said base includes a transversely disposed sleeve located approximately centrally of said base end portion, said main drive shaft is in internal telescopic relationship to said sleeve, means beneath the screen unit for collecting material which has passed therethrough, and said collecting means includes a tubular sleeve in external surrounding relationship to said first-mentioned sleeve and said main drive shaft.

7. The machine as defined in claim 1 including means coupled to one of said main drive shaft end portions for imparting rotation to said main drive shaft, and counterweight means connected to an oposite end of said main drive shaft.

8. The machine as defined in claim 1 including means between said base and said frame member for adjustably varying the inclination of said frame member relative to said base.

9. The machine as defined in claim 1 wherein said screen units are each defined by a frame and a screen, coupling means for securing together each screen and frame, means for adjusting the coupling means to selectively loosen or tighten the screen and frame relative to each other without completely disengaging said coupling means, each coupling means includes a housing carried by one component of an associated screen unit and means defining a bearing surface of another component of the screen unit, a pin mounted for rotary and reciprocal movement relative to said housing, a terminal portion of said pin being in contact with said bearing surface in the coupled position of said screen unit but being retractable to break contact with said bearing surface to uncouple said screen and frame, and said terminal portion being radially offset from the axis of rotation of said pin whereby rotation of the latter varies the reaction forces between the terminal end of the pin and the bearing surface to selectively loosen or tighten the screen and frame.

10. The machine as defined in claim 3 wherein said base includes a transversely disposed sleeve located approximately centrally of said base end portion, and said main drive shaft is in internal relationship to said sleeve.

11. The machine as defined in claim 3 including means coupled to one of said main drive shraft end portions for imparting rotation thereto, and counterweight means connected to an opposite one of said main drive shaft end portions.

12. The machine as defined in claim 7 including means between said base and said frame member for adpjustably varying the inclination of said frame member relative to said base.

13. The machine as defined in claim 8 wherein said adjusting means includes a pair of links pivotally connected to each other, means pivotally connecting one of said links to said base, means pivotally connecting the other of said links to said frame member, and means for varying the points of connection between said links to lengthen and shorten the distance therebetween for tilting said frame member.

14. The machine as defined in claim 8 wherein said adjusting means includes a pair of links pivotally connected to each other, means pivotally connecting one of said links to said base, means pivotally connecting the other of said links to said frame member, and means for varying the points of connection between said links to lengthen and shorten the distance therebetween for tilting said frame member, said last-mentioned means is a handle for rotating said first-mentioned link, and means are provided for retaining said handle in a selected position of adjustment.

15. A machine of the character described comprising a base having opposite end portions, means connecting a frame member to said base for relative movement therebetween, at least one screen unit disposed above said frame member, means for oscillating said screen unit, said oscillating means including a main drive shaft disposed transversely of said base, means rotatably journalling said main drive shaft to said base approximately centrally of the base end portions whereby machine balance is maintained irrespective of the oscillatory motion of said screen unit, said screen unit being defined by a frame and a screen, coupling means for securing together said screen and frame, means for adjusting the coupling means to selectively loosen or tighten the screen and frame relative to each other without completely disengaging said coupling means, said coupling means including a housing carried by one component of the screen unit and means defining a bearing surface of the other component of the screen unit, a pin mounted for rotary and reciprocal movement relative to said housing, a terminal portion of said pin being in contact with said bearing surface in the coupled position of said screen unit but being retractable to break contact with said bearing surface to uncouple said screen and frame, said terminal portion being radially offset from the axis of rotation of said pin whereby rotation of the latter varies the reaction forces between the terminal end of the pin and the bearing surface to selectively loosen or tighten the screen and frame, means for locking said pin in different positions of rotation thereof, and means permitting retraction of said pin in the absence of rotational movement thereof.

16. A machine of the character described comprising a base having opposite end portions, means connecting a frame member to said base for relative movement therebetween, at least one screen unit disposed above said frame member, means for oscillating said screen unit, said oscillating means including a main drive shaft disposed transveresely of said base, means rotatably journalling said main drive shaft to said base approximately centrally of the base end portions whereby machine balance is maintained irrespective of the oscillatory motion of said screen unit, said screen unit being defined by a frame and a screen, means for removably supporting said screen upon said frame, means apart from said supporting means for locking said screen to said frame, means for releasing said locking means without affecting said supporting means, means connecting said frame to said oscillating means separate and apart from said supporting, locking and releasing means whereby said screens can be removed from said frame without disrupting the connection between the frame and said oscillating means, said supporting means being formed by hanger means carried by said screen for suspending said screen from said frame, and said locking means includes means for creating forces urging said hanger means into intimate contacting relationship with said frame.

17. A machine of the character described comprising a base having opposite end portions, means connecting a frame member to said base for relative movement therebetween, at least one screen unit disposed above said frame member, means for oscillating said screen unit to advance articles therealong, said screen unit including a plurality of generally parallel rods supported upon at least a single generally transverse bridging member, said bridging member including means between adjacent pairs of rods for preventing article jamming by providing unobstructed passage of articles past said bridging member, said screen unit including a frame and a screen, said screen being defined at least in part by said bridging member and said rods, means for removably supporting said screen upon said frame, means connecting said oscillating means to said frame separate and apart from said supporting means whereby said screen may be removed from said frame without affecting the connection between said frame and oscillating means, means for locking said screen to said frame, means for adjusting said locking means to vary the locking forces thereby varying the vibratory motion of said screen upon the operation of said oscillating means, said adjusting means including a projectable, retractable, and rotatable pin means, and said pin means includes an eccentric portion for varying the locking forces in dependence upon various positions of relative rotation thereof.

18. A machine of the character described comprising a base having opposite end portions, means connecting a frame member to said base for relative movement therebetween, at least one screen unit disposed above and connected to said frame member, means for oscillating said frame member to advance articles along said screen unit, said screen unit including a screen and a frame, said screen including a plurality of generally parallel rods supported upon at least a single generally transverse bridging member, one of said screen and frame includes a plurality of pins and the other includes a plurality of notches, said pins and notches being in engagement for supporting said screen by said frame, and means for locking said screen to said frame to maintain said pins and notches in engaged relationship.

19. The machine as defined in claim 18 wherein said locking means includes eccentric means for bringing said notches and pins into intimate bearing relationship.

20. A machine of the character described comprising a base having opposite end portions, means connecting a frame member to said base for relative movement therebetween, at least one screen unit disposed above said frame member, means for oscillating said screen unit, said oscillating means including a main drive shaft disposed transversely of said base, means rotatably journalling said main drive shaft to said base, said screen unit being defined by a frame and a screen, coupling means for securing together said screen and frame, said coupling means including a housing carried by one component of the screen unit and means defining a bearing surface of the other component of the screen unit, a pin mounted for rotary and reciprocal movement relative to said housing, a terminal portion of said pin being in contact with said bearing surface in the coupled position of said screen unit but being retractable to break contact with said bearing surface to uncouple said screen and frame, said terminal portion being radially offset from the axis of rotation of said pin whereby rotation of the latter varies the reaction forces between the terminal end of the pin and the bearing surface to selectively loosen or tighten the screen and frame, means for locking said pin in different positions of rotation thereof, and means permitting retraction of said pin in the absence of rotational movement thereof.

21. A machine of the character described comprising a base having opposite end portions, means connecting a frame member to said base for relative movement therebetween, at least one screen unit disposed above and connected to said frame member, means for oscillating said frame member thereby to oscillate said screen unit, said oscillating means including a main drive shaft disposed transversely of said base, means rotatably journalling said main drive shaft to said base, said screen unit being defined by a frame and a screen, means for removably supporting said screen upon said frame, means for locking said screen to said frame, said supporting means being formed by hanger means carried by said screen for suspending said screen from said frame, and said locking means includes means for creating forces urging said hanger means into intimate contacting relationship with said frame.

(References on following page)

References Cited

UNITED STATES PATENTS

| | | | |
|---|---|---|---|
| 287,597 | 10/1883 | Werner | 209—405 X |
| 730,162 | 6/1903 | Roger | 209—326 |
| 1,214,506 | 2/1917 | Brasack | 209—314 |
| 2,010,858 | 8/1935 | Mazle | 209—326 |
| 2,223,455 | 12/1940 | McLauchlan | 209—415 X |
| 1,616,917 | 2/1927 | Mueller | 209—404 X |
| 2,588,088 | 3/1952 | Cover | 209—269 |
| 2,591,086 | 4/1952 | McLauchlan | 209—344 X |
| 2,653,702 | 9/1953 | Linke | 198—220 |
| 2,911,097 | 11/1959 | Rose | 209—393 |
| 3,123,558 | 3/1964 | Sullivan | 209—403 X |
| 3,053,379 | 9/1962 | Roder | 209—367 X |
| 3,139,400 | 6/1964 | Kyle | 209—403 |
| 3,362,524 | 1/1968 | Kolman | 198—220 |

FOREIGN PATENTS 136,940  4/1950  Australia.

HARRY B. THORTON, *Primary Examiner.*

R. HALPER, *Assistant Examiner.*

U.S. Cl. X.R.

209—314, 325, 383, 415